Figure 1:
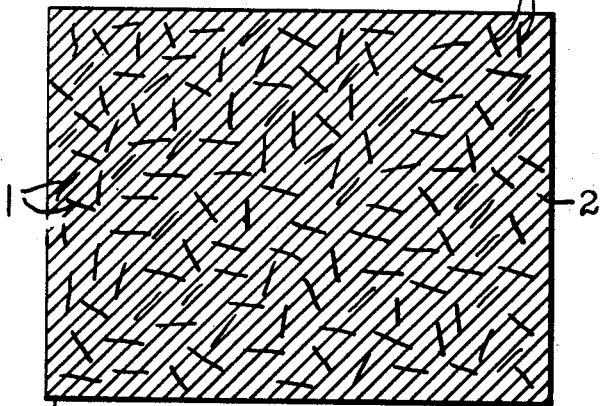

Unoriented Polarizing Agent

Undrawn Film Base of Synthetic Linear Polymer

Oriented Polarizing Agent

Cold-Drawn Film Base

Inventors
Emerson Dudley Bailey
Merlin Martin Brubaker
By R. F. Miller
Attorney

Patented June 17, 1941

2,246,087

UNITED STATES PATENT OFFICE 2,246,087

FILM

Emerson Dudley Bailey and Merlin Martin Brubaker, Wilmington, Del., assignors to E. I. du Pont de Nemours & Company, Wilmington, Del., a corporation of Delaware Application September 30, 1938, Serial No. 232,684

11 Claims. (Cl. 88—65)

This invention relates to new polarizing materials of improved properties.

Land in U. S. Patents 2,078,254, 2,123,901 and 2,123,902 and Land and Friedman 1,918,848 have disclosed the use of polarizing agents of various kinds in plastic transparent sheeting such as that from cellulose derivatives, vinyl resins and other synthetic resinous products.

This invention has as an object the provision of a new and improved polarizing transparent film. A further object is the provision of improved transparent polarizing sheeting elements. A still further object is the preparation of more highly oriented polarizing films than has hitherto been possible. Other objects will appear hereinafter.

These objects are accomplished by the following invention wherein a finely divided polarizing agent incompatible with, i. e. undissolved by a linear superpolymer is incorporated in a film of said superpolymer, said film being oriented preferably subsequent to the incorporation of the polarizing agent.

In the process of the present invention a polarizing agent is incorporated in a film of a synthetic linear polymer for example those described in U. S. 2,071,251–253 and 2,130,948. These polymers have been referred to as "synthetic linear condensation polymers" but polymers of the same composition or their equivalents may be made through equivalent reactions not involving condensations in the strict sense. These polymers are characterized by being capable of being formed into filaments which yield oriented fibers on the application of tensile stress at temperatures below the melting point of the polymer, i. e. which yield molecularly oriented fibers on "cold drawing." Of these the polyamides are most valuable in the preparation of fibers, films, sheets, ribbons, etc. and are used in the detailed discussion below to exemplify the class of linear superpolymers.

These are of two types: those obtainable from polymerizable monoaminomonocarboxylic acids or their amide-forming derivatives; and those obtainable from the reaction of suitable diamines with dicarboxylic acids or amide-forming derivatives thereof. On hydrolysis with hydrochloric acid, these polyamides revert to the reactants from which they are derived, the amino derivatives being in the form of the hydrochlorides. Excluding the effects of small variations in molecular weight and the reactants used in their preparation, the fiber-forming polyamides are characterized by the fact that they yield after cold drawing (application of tensile stress in the solid state) as, for instance, in the case of filaments, or after cold working (application of compressive stress) as in ribbons, sheets, films and the like, products which upon X-ray examination show molecular orientation. In general, cold drawing also improves the toughness, stiffness, modulus of elasticity and the tensile strength of the articles. In general, the synthetic linear polyamides do not exhibit fiber-forming properties unless their intrinsic viscosity is above 0.4 where intrinsic viscosity is defined as $$\frac{\log \eta_r}{C}$$

wherein $\eta_r$ is the viscosity of a dilute metacresol solution of the polyamide divided by the viscosity of metacresol in the same units and at the same temperature, and C is the concentration in grams of polyamide per 100 cc. of solution. The polyamides, in common with other fiber-forming synthetic linear polymers, are microcrystalline in character as evidenced by their sharp melting point and the nature of the diffraction pattern which they furnish on X-ray examination.

The properties of high linear extension and high orientation exhibited by these superpolymers after application of stress in the solid state, and particularly by the superpolyamides render these especially valuable for use with polarizing agents. Furthermore the high melting point and high heat stability of the polymers render them particularly valuable in polarizing films to be used near a light source and subject to high temperatures.

Since the polyamides melt sharply and without appreciable decomposition, it is possible to form films, sheets, and the like directly from the molten polymer. In order to insure the uniform production of clear films, the films obtained from the molten polymers are preferably tempered by rapid chilling. For this purpose the polymer can be extruded as a sheet into a cooling atmosphere or into a suitable quenching liquid such as water or other inert non-solvent for the polymer. This rapid chilling or tempering also leads to a tougher product.

In many instances it is found advantageous to subject the films thus formed to one or more operations designed to improve the physical properties of the films. One such operation is that of "cold working" wherein compressive stress is applied to the solid polymer, causing it to flow in a preferred direction. A convenient method for carrying out the process of cold working consists in passing the film of the polymer between "cold rolls" at temperatures substantially below the melting point of the polymer. Another operation often found of value consists in subjecting the films under tension to the action of heat with or without the simultaneous action of a non-solvent mild swelling agent for the polymer, e. g., water, steam or alcohol, and allowing it to cool under the continued application of tension.

For the most part, polyamides from straight chain (polymethylene) polyamide-forming reactants, although in general relatively insoluble in the more common solvents, are soluble in phenol and usually in the lower members of the fatty acid series, such as formic and acetic acids. Films can therefore be prepared by flowing solutions or emulsions of the polyamide on a suitable surface, e. g., glass, and evaporating the solvent, or by regenerating the solvent in films formed by extruding a solution of the polyamide through a slit orifice or between rolls into a suitable coagulating bath. Certain polyamides, e. g., those containing hydrocarbon constituents and interpolyamides are more soluble than those of the simple polymethylene type, and in many cases are soluble in alcohols or alcohol-chlorinated hydrocarbon mixtures. These polymers are easily obtained in film form by solvent evaporation procedures.

The incorporation of the polarizing agents of this invention may be carried out in a number of ways and the actual method of incorporation is in many instances dictated by the chemical nature of the agent. All of the agents to be described are orientable, are in the form of finely divided particles and are incompatible with the molten polymer or a solution of the polymer. The agent may be formed separately and incorporated with the polymer or the agent may be produced in the solid film or at some stage in the formation of the polymer. Thus agents inert to heat and to action of reactants during polymerization may be mixed with the monomeric constituents and the polymerization carried out in the presence of the polarizing agent. Agents which would tend to react with the reactants can be added to the completely polymerized polymer and thoroughly mixed by mechanical agitation provided they are stable at the temperature of molten polymer. Agents which are unstable at the temperatures of the molten polymer may be incorporated by thorough mixing in a suitable solution of the polymer at relatively low temperatures.

Any polarizing agent, may be incorporated by the above methods in the film. Dichroic crystals, selective scattering agents, metallic agents and dyes may be used with good effect.

The polarizing agent is incorporated into the film. The film is preferably unoriented or but partially oriented, i. e. incompletely oriented. While polarizing effects are obtained by incorporating the polarizing agent in the oriented films, e. g. by dyeing, far better results are obtained by incorporating the polarizing agent in a substantially unoriented film which is then oriented by any suitable method, e. g. by cold rolling, extrusion or the like.

Figure 2:
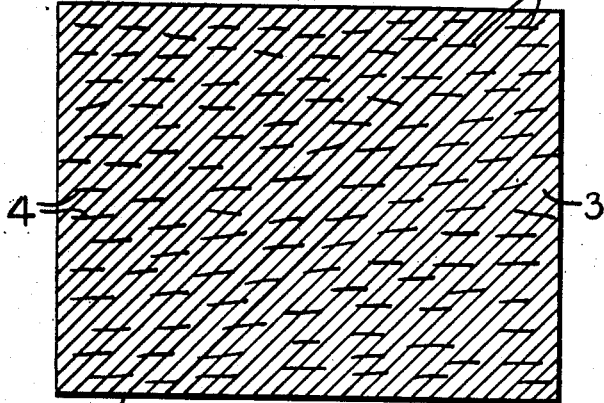

In the accompanying drawing:

Fig. 1 shows in plan view the film base and polarizing agent before orientation of the film and polarizing agent, and Fig. 2 is a similar view after orientation of the film and agent.

The numeral 1 indicates the polarizing particles which, as shown in Fig. 1, are initially disposed in all directions throughout the film base 2 before cold drawing of the latter. The synthetic linear polymers, as previously indicated, possess the unusual property of cold drawing, that is, of being drawn in the solid state to substantial and permanent increase in length which results in orientation of the long chain polymer molecules in the direction in which the film has been cold drawn. Cold drawing of a film containing polarizing particles as shown in Fig. 1 results also in orientation of the polarizing particles substantially parallel to one another with their long axis in substantial parallelism with the direction in which the polymer aggregates are preponderately oriented.

In Fig. 2 the numeral 3 indicates the film base after it has been cold drawn and the numeral 4 designates the oriented polarizing agent.

The invention has been described in detail. The following examples are intended to illustrate the invention and not to limit it.

EXAMPLE I

*Polarization by dichroic crystals*

A copolyamide (prepared from equimolecular parts of hexamethylenediammonium adipate and decamethylenediammonium sebacate), is dissolved in methylethynyl carbinol by warming and to this solution is added a suspension of finely divided herapathite, following which the finely divided material is thoroughly dispersed by vigorous agitation. A portion of this solution is poured while still hot onto a glass plate and an even film produced by means of a leveling blade. After baking, the film is removed from the glass plate by immersion in a suitable non-solvent liquid. The resulting film is then subjected to a uniform tensile stress until the desired degree of orientation of the polarizing agent is obtained. It is frequently desirable to cold draw the superpolymer substantially completely.

EXAMPLE II

*Polarization by selective scattering with transparent crystals having a plurality of indices of refraction one of which substantially coincides with that of the film*

To molten polyhexamethyleneadipamide of intrinsic viscosity of 1.12 is added 5 to 15% of calcium carbonate in the form of needles of aragonite between 1 and 2 microns in size. This mixture is then extruded through forming rolls into cold water. The resulting turbid film is then passed three times through polished steel cold rolls, traveling at an even speed, in order to develop the desired degree of plane polarization in the undiffused beam.

EXAMPLE III

*Polarization by metal particles*

Polyhexamethyleneadipamide, of intrinsic viscosity 1.12, is extruded through forming rolls into cold water. The resulting film is translucent and has a thickness of 0.014". This film is then immersed in an alkaline solution of bismuth tartrate and boiled for two hours. The film is then soaked for ½ hour in an alkaline bath and transferred to a bath made up of equal parts of 2 N-sodium hydroxide and 37% aqueous formaldehyde and boiled for three hours. The resulting black film is then cold drawn to develop the desired polarizing action on the light transmitted through it.

Example IV

Polarization produced with dyes

A film of polyhexamethyleneadipamide prepared by extrusion into cold water is immersed in a bath made up to 2.4 grams dyestuff, 2.4 grams $Na_2SO_4.10H_2O$, and 0.8 gram of glacial acetic acid in a liter of water at a temperature between 80–90° C. for one hour. The dyestuff is that obtained when one molecule of tetrazotized benzidene is coupled in acid solution to one mole of H acid (1-amino-8-naphthol-3-6-disulfonic acid). This compound is coupled in alkaline solution to one mole of diazobenzene and the resulting compound is coupled to one mole of 1-4-hydroxy acid (1-naphthol-4-sulfonic acid). The dyed film is removed and carefully washed and dried. The film is then cold drawn until it develops a marked polarizing effect on light transmitted through it.

Although this invention has been described with particular reference to polyamides, it is applicable broadly to synthetic linear polymers particularly the superpolymers described in U. S. Patents 2,071,250–2,071,253 and 2,130,948 and including polyesters, polyacetals, polyureas, polythioureas, polyurethanes, polyethers, polyesterpolyamides, and other copolymers. The preparation of polymers of this class is described in detail in the patents referred to above.

The superpolyamides described in the above patents are most useful for the purposes of the present invention. A particularly valuable class of these comprises those derived from diamines of formula $NH_2CH_2RCH_2NH_2$ and dicarboxylic acids of formula $HOOCCH_2R'CH_2COOH$ or their amide-forming derivatives, in which R and R' are divalent hydrocarbon radicals free from olefinic and acetylenic unsaturation and in which R has a chain length of at least two carbon atoms. An especially valuable group of polyamides within this class are those in which R is $(CH_2)_x$ and R' is $(CH_2)_y$ wherein $x$ and $y$ are integers and $x$ is at least two. As examples of polyamides which fall within one or both of these groups might be mentioned polytetramethylene adipamide, polytetramethylene suberamide, polytetramethylene sebacamide, polypentamethylene sebacamide, polyhexamethylene adipamide, polyhexamethylene β-methyl-adipamide, polyhexamethylene sebacamide, polyoctamethylene adipamide, polydecamethylene adipamide, polydecamethylene p-phenylene diacetamide, and poly-p-xylylene sebacamide. This invention is also applicable to polyamides derived from polymerizable monoaminomonocarboxylic acids or their amide-forming lactams or other derivatives, such as 6-aminocaproic acid, caprolactam, 9-aminononanoic acid, and 11-aminoundecanoic acid.

Any asymmetric dichroic crystal having a crystal size below 100mµ and preferably below 50mµ may be used as described in Example I including the herapathite of the example, and other periodides of quinine alkaloid bisulfates as well as tourmaline, pennine, etc. The crystals must be of orientable shape and of such size as to produce an apparently optically continuous sheet. Those crystals which are practically non-absorbing with respect to one axis are preferred. Large amounts of the dichroic crystals may be incorporated without decreasing the light transmission too disadvantageously.

Any orientable, anisotropic, transparent, finely divided, crystal having a high degree of asymmetry and a plurality of indices of refraction, one of which substantially coincides with that of the superpolymer film may be used as disclosed in Example II. Instead of the aragonite of the example, the crystals of the following table may be employed.

Table

*Agents for production of polarization by selective scattering*

| | α | β | γ |
|---|---|---|---|
| $SrCO_3$ | 1.516 | 1.664 | 1.666 |
| $BaCO_3$ | 1.529 | 1.676 | 1.677 |
| $CaCO_3$ (aragonite) | 1.531 | 1.682 | 1.686 |
| $B_2O_3.3H_2O$ (sassolite) | 1.34 | 1.456 | 1.459 |
| $Li_2CO_3$ | 1.428 | 1.567 | 1.572 |
| $K_2CO_3$ | 1.426 | 1.531 | 1.541 |
| KCNS | 1.532 | 1.660 | 1.730 |
| NaCNS | 1.545 | 1.625 | 1.695 |

| | ω | ε |
|---|---|---|
| $CaCO_3$ (calcite) | 1.658 | 1.486 |
| Triiodobenzene | 1.717 | 1.563 |

| | α | β | γ |
|---|---|---|---|
| Aminoacetic acid | 1.495 | 1.615 | 1.650 |
| Codeine (hydrated) | 1.543 | 1.656 | 1.684 |
| o-Acetylsalicylic acid | 1.505 | 1.645 | 1.655 |
| —Cinchonine | 1.570 | 1.685 | 1.690 |
| Hydrocarbostril | 1.479 | 1.710 | 1.810 |
| 1,3,5-triphenylbenzene | 1.524 | 1.867 | 1.873 |
| Picramic acid | 1.54 | 1.95 | 1.505 |
| Benzenetricarboxylic acid (1,2,3) | 1.432 | 1.636 | 1.674 |
| —Naphthol | 1.56 | | 1.69 |
| Phenylbiuret | 1.559 | | 1.73 |
| Theobromine salicylate | 1.42 | | 1.74 |
| 4-4-difluoro-2-nitrodiphenyl | 1.536 | 1.594 | 1.787 |
| Diphenylmaleic anhydride | 1.495 | 1.513 | 1.672 |
| Potassium acid phthalate | 1.498 | 1.659 | 1.660 |
| Magnesium 1-5-naphthalene-disulfonate hexahydrate | 1.520 | 1.613 | 1.639 |
| Antipyrine | 1.57 | 1.69 | 1.73 |
| Potassium picrate | 1.527 | 1.903 | 1.952 |
| Isohydroxydimethyluric acid | 1.495 | 1.513 | 1.672 |
| Hexamethylbenzene | 1.503 | 1.747 | 1.80 |

Large amounts of these materials may be employed without difficulty.

While in the example the agent was added to the molten polymer immediately preceding extrusion, the incorporation could be made in many ways, depending on the stability of the agent. For example, a suitable agent could be added in slurry form to the reactants prior to polymerization and the polymerization could then take place in the presence of the agent.

Any metal which may be prepared in colloidal particles of asymmetric shape may be used to replace the bismuth of Example III, including tellurium, arsenic, antimony, silver, platinum, and gold. Of these, tellurium and bismuth are most desirable from the color standpoint.

The method of incorporation indicated in the example is illustrative only. The colloidal metal may be prepared separately and added to a solution of polymer or various interpolymers, may be added to the reactants prior to polymerization, or may be added to the molten polymer.

The dye given in Example IV applied to the formed films yields an excellent polarizing film but all water-soluble azo dyes may be used as described in Example IV. The preferred embodiment of this form of the invention is to dye the unoriented film and later "cold draw," "cold roll" or otherwise orient the film. While the specific dyestuffs are preferably incorporated from aqueous solution to the formed film, suitable dyes including dyes soluble in other solvents than water may be added to solutions of polymers. The dye solution may also be applied to the oriented film and produce a film which polarizes light which is transmitted through it. While in the present example a single dye has been added, the incorporation of multiple dyes may be practiced to give more neutral color to the polarizing film.

Specific additional dyes which may be used include "Pontamine CLG," and "Pontamine Deep Blue BH."

The dyes and the metal particles are used in concentrations insufficient to too greatly decrease the light transmission but sufficient to exhibit the desired polarizing effect. The concentrations are readily determined by experiment.

The films of the present invention as finally prepared are transparent polarizing oriented films of a superpolymer containing therein a polarizing agent particularly one from the class consisting of asymmetric dichroic crystals of size below $100m\mu$; anisotropic, transparent, finely divided crystals having a high degree of asymmetry and a plurality of indices of refraction, one of which substantially coincides with that of the superpolymer; colloidal asymmetricl metal particles; and water-soluble azo dyes. The orienting of the film is preferably done after the incorporation.

With the dichroic crystals and the selective scattering crystals orienting after incorporation of the agent is practically essential.

The film of the present invention may be employed in automobile headlights, windshields and windows, in eyeglasses, goggles, and sunglasses, in photography, e. g. in camera lenses, in lecture demonstration apparatus, in examining means for inspecting jewels, in microscopes, in windows, etc. It may be used alone or laminated with ordinary glass. It may be used in mirrors and in connection with three dimensional movies.

Crystalline synthetic linear condensation superpolymers offer great advantage over the cellulose derivatives ordinarily used as bases for polarizing films because of the high degree to which it is possible to stretch (cold draw) them. This is of very great advantage since the degree of orientation is in large part dependent on the degree to which the film can be stretched. In those agents which are incorporated in the already oriented film the degree of orientation of the film determines the excellence of the polarizing film obtained. X-ray diffraction studies have shown that the degree of orientation of the crystalline synthetic linear superpolymer is very much higher than in films heretofore produced. It now appears that selective scattering agents will be used on the head lamps in the automotive application and absorbing agents will be used for the visor or glasses worn by the driver. The most promising of the absorbing agents is metallic bismuth, and it is highly doubtful if this agent can be used in films less highly oriented than those obtained from the crystalline synthetic linear superpolymer. The great advantage of metallic bismuth lies in its color change (black to white) and its high stability. Films from crystalline synthetic linear superpolymers are outstandingly superior to other films for use with the scattering agents because of the high degree of stretch which is possible in these films and also because of their great heat stability. As has already been pointed out, these agents will be used chiefly on automobile head lamps where they will be subject to considerable heat radiation and the life of the polarizing film will be in part determined by the heat stability of the film. The preferred particle size for scattering agents is much larger than those which have been previously in common use (herapathite). The degree of stretch required to orient these larger particles will therefore be much greater than for the fine colloidal particles.

Additional advantages include: fire resistance, slow dimensional changes on exposure to humidity, for movie film—thinness with wear resistance, resistance to weathering—auto headlights, high melting point and low flammability where used close to a source of light or heat, and resistance to hydrolysis which results in better aging qualities and more permanent films.

As many apparently widely different embodiments of the invention may be made without departing from the spirit and scope thereof, it is to be understood that we do not limit ourselves to the specific embodiments thereof except as defined in the appended claims.

We claim:

1. A plane polarizing film having a high degree of transparency for polarized light and comprising a light-polarizing substance dispersed throughout light-transmitting, high molecular weight synthetic linear polymer which has been extended under stress in the solid unoriented state with the polarizing substance contained in the solid polymer to a state of permanent high linear extension and molecular orientation of the polymer and of the polarizing substance in the direction of the stress, said plane polarizing film exhibiting a high degree of permanent orientation up to temperatures approaching the melting point of the polymer.

2. A plane polarizing film comprising a polymer exhibiting molecular orientation upon X-ray examination, and a finely divided polarizing agent consisting of particles having a long and a short axis dispersed throughout said polymer and oriented with the long axis of the particles in substantial parallelism with the direction in which said polymer is oriented, said polymer being a high molecular weight, synthetic linear polymer which has been extended under stress in the solid unoriented state with the polarizing agent contained in the solid polymer to a state of permanent high linear extension and molecular orientation of the polymer and of the polarizing agent in the direction of the stress, said plane polarizing film exhibiting a high degree of permanent orientation in the polymer and in the polarizing substance up to temperatures approaching the melting point of the polymer.

3. The polarizing film set forth in claim 2 in which said polarizing agent consists of anisotropic transparent crystals having a high degree of needle-like asymmetry and a plurality of indices of refraction, at least one of which substantially coincides with that of the polymer.

4. The polarizing film set forth in claim 2 in which said polarizing agent is a colloidal needle-like asymmetric metal.

5. The polarizing film set forth in claim 2 in which said polarizing agent is colloidal needle-like asymmetric metallic bismuth.

6. The polarizing film set forth in claim 1 in which said polarizing substance is a water-soluble azo dye.

7. The polarizing film set forth in claim 2 in which said polymer is polyhexamethylene adipamide and in which said polarizing agent is colloidal needle-like asymmetric metallic bismuth.

8. The polarizing film set forth in claim 1 in which said polymer is polyhexamethylene adipamide and in which said polarizing agent is a water-soluble azo dye.

9. The polarizing agent set forth in claim 1 in which said polymer is polyhexamethylene adipamide and in which said polarizing agent is a water-soluble azo dye, said dye being the coupling product of 1-naphthol-4-sulfonic acid with the coupling product of diazobenzene with benzidine tetrazo H acid.

10. The polarizing film set forth in claim 1 in which said polymer is a polyamide.

11. A plane polarizing film set forth in claim 2 in which said polymer is a linear polyamide.

EMERSON DUDLEY BAILEY.
MERLIN MARTIN BRUBAKER.

DISCLAIMER 2,246,087.—*Emerson Dudley Bailey* and *Merlin Martin Brubaker*, Wilmington, Del. FILM. Patent dated June 17, 1941. Disclaimer filed April 27, 1944, by the assignee, *E. I. du Pont de Nemours and Company*.

Hereby enters this disclaimer to claims 1, 2, 4, 5, and 6 of said patent; and further disclaims from claim 3 of said patent any polarizing film except such wherein the polymer is a linear polyamide.

[*Official Gazette May 23, 1944.*]